US012791508B2

(12) United States Patent
Theuss et al.

(10) Patent No.: US 12,791,508 B2

(45) Date of Patent: Nov. 10, 2026

(54) SEMICONDUCTOR DEVICE FOR MEASURING HYDROGEN AND METHOD FOR MEASURING A HYDROGEN CONCENTRATION IN A MEDIUM BY MEANS OF SUCH A SEMICONDUCTOR DEVICE

(71) Applicant: Infineon Technologies AG, Neubiberg (DE)

(72) Inventors: Horst Theuss, Wenzenbach (DE); Rainer Markus Schaller, Aichen (DE)

(73) Assignee: Infineon Technologies AG, Neubiberg (DE)

( * ) Notice: Subject to any disclaimer, the term of this patent is extended or adjusted under 35 U.S.C. 154(b) by 315 days.

(21) Appl. No.: 18/496,428

(22) Filed: Oct. 27, 2023

(65) Prior Publication Data

US 2024/0151674 A1 May 9, 2024

(30) Foreign Application Priority Data

Nov. 3, 2022 (DE) ......................... 102022211626.7

(51) Int. Cl.
*G01N 27/12* (2006.01)
*G01N 27/72* (2006.01)

(52) U.S. Cl.
CPC ............. *G01N 27/12* (2013.01); *G01N 27/72* (2013.01)

(58) Field of Classification Search
CPC ........ G01N 27/12; G01N 27/72; G01N 19/10; G01N 27/16; G01N 33/005; G01N 27/4141
See application file for complete search history.

(56) References Cited

U.S. PATENT DOCUMENTS

| | | | | |
|---|---|---|---|---|
| 4,926,155 | A | 5/1990 | Colla et al. | |
| 10,807,862 | B1 | 10/2020 | Brandl et al. | |
| 2017/0343522 | A1 | 11/2017 | Ikehashi et al. | |
| 2019/0120781 | A1* | 4/2019 | Kobayashi | G01N 27/12 |
| 2020/0326256 | A1* | 10/2020 | Senz | G01L 9/0045 |

FOREIGN PATENT DOCUMENTS

| | | | | |
|---|---|---|---|---|
| CN | 103424441 A | | 12/2013 | |
| CN | 110553764 A | * | 12/2019 | G01L 19/06 |
| CN | 111792616 A | | 10/2020 | |
| DE | 102014105861 A1 | | 10/2015 | |
| DE | 102014010116 B4 | | 11/2018 | |
| EP | 3056865 A1 | * | 8/2016 | G01D 3/0365 |
| WO | WO-9519563 A1 | * | 7/1995 | G01N 27/14 |

OTHER PUBLICATIONS

Henriksson, J., et al., "Ultra-low power hydrogen sensing based on a palladium-coated nanomechanical beam resonator," Nanoscale, 2012, vol. 4(16), pp. 5059-5064.

* cited by examiner

*Primary Examiner* — Francis C Gray
(74) *Attorney, Agent, or Firm* — Harrity & Harrity, LLP

(57) ABSTRACT

The application relates to a semiconductor device for measuring hydrogen including a sensor chip having a sensor layer, which changes its mechanical stress upon contact with hydrogen. The sensor chip furthermore has a sensor for detecting the change in stress, wherein the construction of the semiconductor device affords the sensor layer and/or the sensor protection against further mechanical stresses. The application furthermore relates to a method for measuring a hydrogen concentration.

16 Claims, 3 Drawing Sheets

SEMICONDUCTOR DEVICE FOR MEASURING HYDROGEN AND METHOD FOR MEASURING A HYDROGEN CONCENTRATION IN A MEDIUM BY MEANS OF SUCH A SEMICONDUCTOR DEVICE

CROSS-REFERENCE TO RELATED APPLICATION

This application claims priority to German Patent Application No. 102022211626.7 filed on Nov. 3, 2022, the content of which is incorporated by reference herein in its entirety.

TECHNICAL FIELD

The application relates to a semiconductor device for measuring hydrogen and to a method for measuring a hydrogen concentration in a medium using such a semiconductor device.

BACKGROUND

Measurement of hydrogen is important for various fields of application. There are safety aspects, in that for example the concentration of hydrogen has to be measured in order to recognize whether an oxyhydrogen explosion may occur. However, in other applications, too, it is advantageous to detect the hydrogen concentration or amount of hydrogen in order to ensure a technical functionality for which the hydrogen is used.

It is an object to provide a semiconductor device for measuring hydrogen which carries out the hydrogen measurement more independently of external influences.

This object is achieved using the combinations of features in the independent patent claims.

SUMMARY

A semiconductor device for measuring hydrogen including a sensor chip is proposed, wherein the sensor chip has a sensor layer, which changes its mechanical stress upon contact with hydrogen, and wherein the sensor chip furthermore has a sensor for detecting the change in stress, wherein the construction of the semiconductor device affords the sensor layer and/or the sensor with protection against further mechanical stresses. A sensor layer that changes its mechanical stress upon contact with hydrogen is also referred to as a hydrogen-active sensor layer.

Furthermore, a method for measuring a hydrogen concentration in a medium using such a semiconductor device is proposed, wherein the sensor layer is contacted with the medium in a first step, and the change in stress of the sensor layer is detected using the sensor in a second step.

A semiconductor device is understood to mean a device which has the sensor chip, but also the construction on which the sensor chip is applied. Furthermore, the semiconductor device also includes a cavity housing possibly present and/or a mold compound and electrical terminals or other attachments. The semiconductor device can thus be understood to mean for example a device which could be sold thus as a hydrogen sensor. Particularly advantageously, a hydrogen measurement can be accomplished by a sensor chip produced substantially from semiconductor, which sensor chip can easily be produced reliably and at reasonable cost in large numbers.

Such a sensor chip has a sensor layer, which changes its mechanical stress upon contact with hydrogen. In other words, this exploits the effect that in the case of some materials hydrogen can change the mechanical stress in a layer, e.g., owing to diffusion and/or adsorption. The sensor layer consists of an Hz-active material. An Hz-active material develops mechanical stresses as a consequence of $H_2$ diffusion and/or $H_2$ adsorption. Examples of such materials are Pd, Pt, Y, or alloys including Pd, Pt, Y as base material. However, ferrite, specific silicon structures or Si nitrides also exhibit the effect. A further group of Hz-active materials which can be used for the sensor layer has so-called swelling effects upon contact with hydrogen. This group includes e.g., indium(III) oxide or tin(IV) oxide.

For the purpose of detecting the change in the mechanical stress of the sensor layer, the sensor chip has a sensor. This can involve an electrical circuit which outputs a changed electrical signal, e.g., a voltage or a current, depending on the change in the mechanical stress in the sensor layer.

These physical effects which make it possible to measure the mechanical stress changes are presented in the dependent claims. By way of example, a bridge circuit could also serve as a sensor for detecting the change in stress, which bridge circuit, in the event of a mechanical stress change, generates a difference voltage, for example, which then represents this mechanical stress change. The construction of the semiconductor device is configured such that it affords the sensor layer and/or the sensor protection against further mechanical stresses. These further mechanical stresses are undesired for the measurement, e.g., are not induced by hydrogen on or in the sensor layer. The further mechanical stresses can be induced for example by way of the construction or the securing of the semiconductor device and can thus influence a hydrogen measurement according to the present measurement principle, which is not desired.

The hydrogen measurement can be effected e.g., by way of the coupling of the sensor layer to a semiconductor-based stress-sensitive sensor with the piezo effect, having e.g., CMOS-based transistor structures including piezoresistive channels or piezoresistors of the meandering type. Magnetic sensors, based e.g., on a magnetoresistive effect, are also possible. Examples thereof are sensors which utilize a piezomagnetic effect such as the piezo Hall effect, or e.g., XMR sensors.

The method for measuring a hydrogen concentration in a medium using a semiconductor device makes it possible to detect the hydrogen (H 2). The semiconductor device and respectively the method for measuring the hydrogen concentration can be calibrated in order that the measurement values can be assigned directly e.g., to a hydrogen concentration.

Advantageous improvements of the semiconductor device specified in the independent patent claim are possible by way of the measures and developments presented in the dependent claims.

It is proposed that the semiconductor device has plastically and/or elastically deformable means which afford the sensor layer and/or the sensor protection against further mechanical stresses. These means are intended to keep these undesired mechanical stresses away from the sensor chip or the sensor layer and/or the sensor or at least to damp them considerably, such that these further mechanical stresses have no significant influence on the measurement of the hydrogen or of the hydrogen concentration. The plastically or elastically deformable means can be configured e.g., as a stress decoupling structure on the chip and/or a low-stress construction of the semiconductor device.

Moreover, it is proposed that the sensor chip furthermore has a substrate, on which the sensor layer and the sensor are fitted, wherein the deformable means have one or more trenches in the substrate which at least partly surround the sensor layer and the sensor. This trench enables the undesired mechanical stresses to be guided past the sensor layer and/or the sensor, mechanically short-circuited or at least damped. The deformation of the trench absorbs elastic stress, for example, and then releases it again toward the outside. However, it is also possible for a plastic deformation to take place, which then converts the absorbed mechanical stress into deformation energy. Such trenches can be produced using suitable patterning technologies in semiconductor engineering. By way of example, the trenches can be produced by etching, either dry- or wet-chemical. The trench or trenches need not completely surround the sensor layer and/or the sensor, rather partial surrounding by the trench is also sufficient.

The substrate is for example undoped silicon or silicon dioxide or other electrically insulating materials.

In implementations, provision is made of a cavity housing having an opening, via which the cavity is connected to the surroundings, wherein the deformable means include a wiring of the sensor chip. In this case, the cavity and the surroundings can have a gaseous medium. In this case, the hydrogen measurement is intended to measure hydrogen molecules present in the medium. In this case, provision is made for the hydrogen molecules to pass in the direction of the sensor layer via the opening. The term wiring is taken to mean the electrical connections, for example applied lines or else bond wires, which electrically supply the sensor layer and/or the sensor and transfer signals.

Furthermore, it is proposed that provision is made of a cavity housing having an opening, via which the cavity is connected to the surroundings, wherein the deformable means include an adhesive connection of the sensor chip, in particular of the substrate of the sensor chip, to a wall of the cavity housing. This adhesive connection enables reliable, permanent connections of parts to be connected, without thermal energy being supplied. The adhesive connection can be configured as soft, in particular, so that it affords protection against further mechanical stresses.

In implementations, the detection of the change in stress of the sensor is dependent on a piezoresistive and/or piezomagnetic effect. In other words, the sensor has regions which exhibit the piezoresistive or piezomagnetic effect. The hydrogen results in a mechanical stress change in the sensor layer. The sensor layer is connected, e.g., mechanically connected, to the sensor and thereby transmits the mechanical stress change to the sensor. By way of the piezoresistive or piezomagnetic effect, the sensor directly or indirectly translates this mechanical stress change into a change in at least one electrical parameter such as the electrical voltage or the electrical current. Piezo effects convert a mechanical stress change into an electrical and/or magnetic change.

By way of example, indium oxide or tin oxide can be used as material for such sensors with a piezo effect.

In the case of a piezoresistive effect, the electrical resistance of a semiconductor or metal is changed if a mechanical stress is applied to such a material. The piezoresistive effect is already applied in semiconductors themselves. However, there is also a so-called giant piezoresistive effect for metal-silicon hybrid structures.

Piezomagnetism is a phenomenon that is observed in some antiferromagnetic and ferromagnetic crystals. In this case, the magnetic polarization is influenced by a mechanical stress. On the other hand, it is also possible to bring about a physical deformation in such a material by applying a magnetic field.

In one implementation, the detection of the change in stress of the sensor includes a difference measurement. The use of a difference measurement is a reliable method in metrology for eliminating effects caused by unwanted influences. This is because if these influences have an identical effect on the variables to be subtracted, they are eliminated by the difference formation. Moreover, the accuracy can be increased using a difference measurement.

Furthermore, it is proposed that the sensor has a transistor including piezoresistive channels, e.g., the drain and source in the case of a field effect transistor. Precise measurements are thus possible using corresponding transistor circuits. In this case, a so-called current mirror can be used, for example, in which the output current is influenced depending on such a transistor including piezoresistive channels.

Furthermore, it is possible that the construction of the semiconductor device has potted regions of the sensor chip with exposed sensor layer, wherein the coefficient of thermal expansion of the mold compound is chosen such that it affords the sensor layer and/or the sensor protection against thermally induced further mechanical stresses. In this case, the mold compound can include e.g., a resin, in particular a casting resin.

In order to produce such a semiconductor device in which the construction of the semiconductor device has potted regions of the sensor chip with exposed sensor layer, and in which the coefficient of thermal expansion of the mold compound is chosen such that it affords the sensor layer and/or the sensor protection against thermally induced further mechanical stresses, it is possible to choose e.g., a film assisted molding method or a pin molding method.

Example implementations are illustrated in the drawing and are explained in greater detail in the following description.

BRIEF DESCRIPTION OF THE DRAWINGS

In the Figures.

In the Figures, the same reference signs are used for identical or similar elements. The illustration in the Figures need not be to scale.

DETAILED DESCRIPTION

Figure 1A:
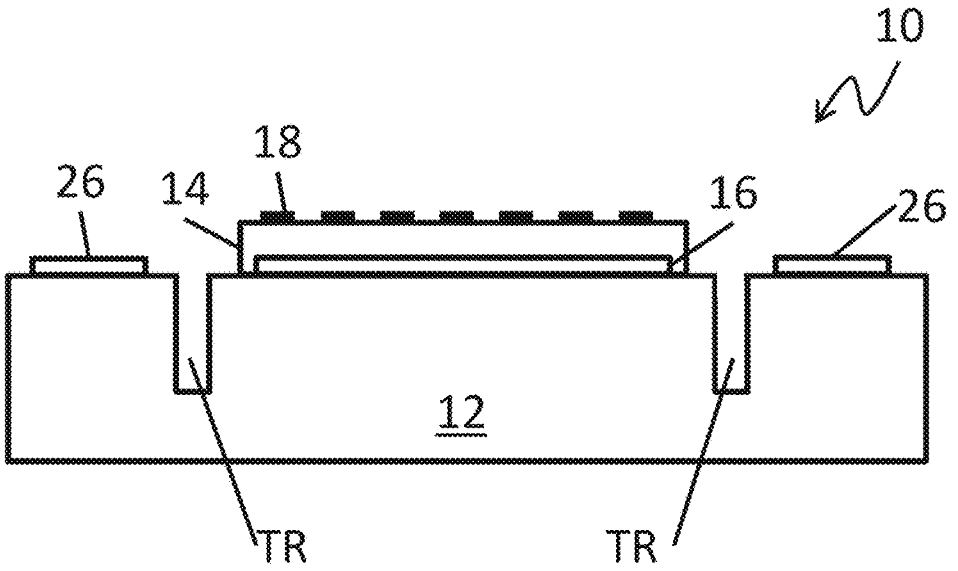
FIG. 1*a* shows a first schematic sectional illustration of the sensor chip.

FIG. 1*a* shows a sensor chip 10 comprising a substrate 12, into which one, two or more trenches TR have been introduced by patterning measures from semiconductor engineering. In actual fact, it is also possible for there to be just a single trench TR, leading for example around a sensor 16 and a sensor layer 14. For example, sensor 16 and sensor layer 14 can be surrounded by deep trenches TR, e.g., in interleaved "L-shapes". In another implementation, the trenches TR form a springlike structure that completely surrounds the sensor 16 and the sensor layer 14. Consequently, the sensor 16 and the sensor layer 14 are resiliently coupled to the surrounding substrate mass 12.

Contact pads 26 consisting of a metal layer or a metal layer system comprising copper, for example, are applied on each of the outer areas of the substrate 12. In the center, the sensor 16 can be seen on the substrate 12. The sensor 16 is configured such that it electrically or magnetically detects the changes in the sensor layer 14 which occur as a result of contact with hydrogen molecules. This takes place e.g., by way of piezoresistive and/or piezomagnetic regions which the sensor 16 has. A catalytic layer 18 is, in some implementations, provided over the sensor layer 14. The catalytic layer 18 comprises catalytic material, e.g., palladium. The catalytic layer 18 is suitable for catalyzing the dissociation of $H_2$ molecules into atoms and/or ions.

Figure 1B:
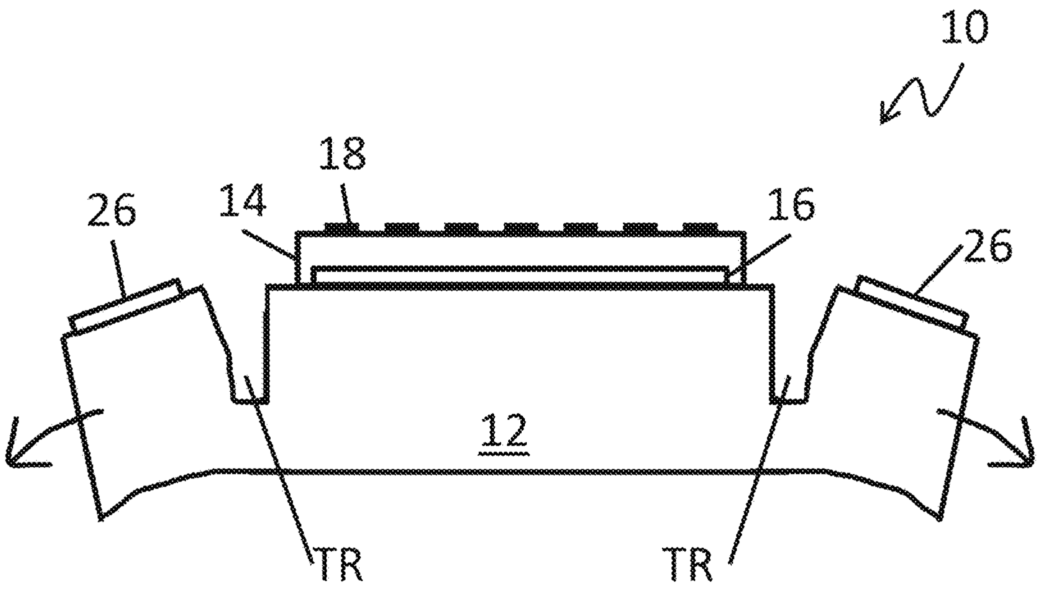
FIG. 1*b* shows a second schematic sectional illustration of the sensor chip.

FIG. 1*b* illustrates the sensor chip 10 from FIG. 1*a* under undesired mechanical stress. It is evident that the outer regions of the substrate 12 with the contact pads 26 bend to the side. This is made possible by the trenches TR. The mechanical stress, which was induced externally either mechanically or thermally, is thus kept away from the sensor 16 comprising the sensor layer 14 under the catalytic layer 18, thereby avoiding or reducing an influence on the measurement.

Figure 2:
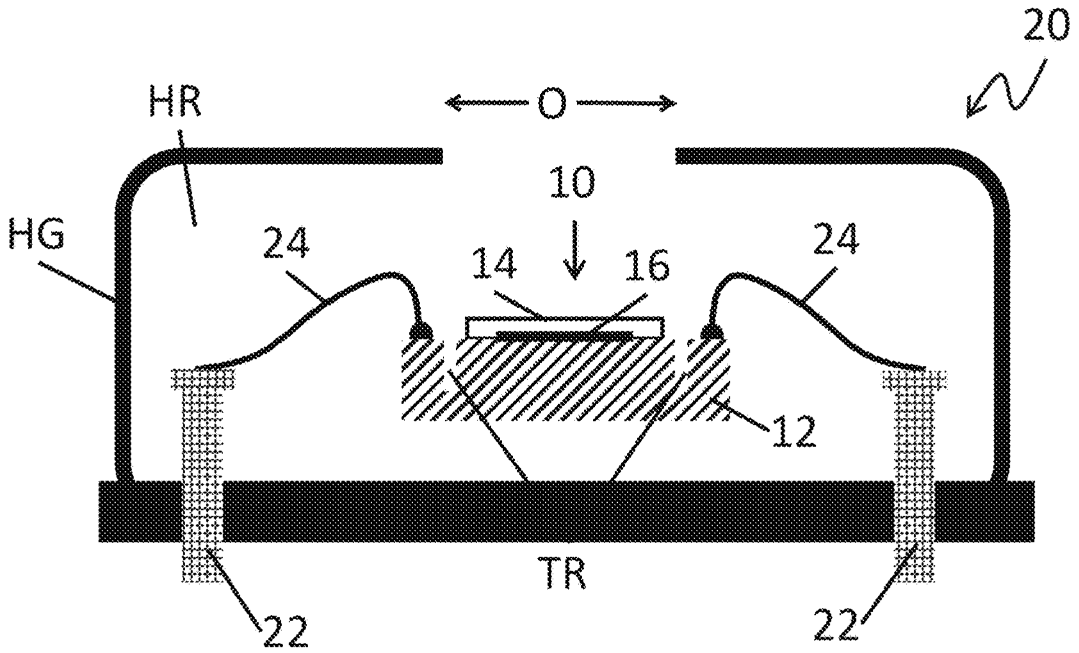
FIG. 2 shows an illustration of the semiconductor device with schematically illustrated sensor chip and cavity housing.

FIG. 2 shows a semiconductor device 20 in a schematic sectional illustration. In this case, provision is made of a cavity housing HG having an opening O centrally toward the top. Through this opening O, the hydrogen can then pass to the sensor layer 14. The sensor chip 10 is arranged centrally below the opening O. However, it could also be arranged offset with respect thereto. In the event of hydrogen arising, ingress of the hydrogen then occurs in the cavity HR. The sensor chip 10 comprising the sensor layer 14 and the sensor 16 can then detect the hydrogen as intended by way of, for example, a piezoresistive effect, a piezomagnetic effect or some other effect.

The substrate 12 once again has the trenches TR or the trench TR, a respective bonding connection 24 being led to a respective contact 22 via the contact pads 26. Optionally, the implementation illustrated in FIG. 2 can also be implemented without the trench TR.

It is possible—and this also applies to the other figures—for more than two contact pads 26 to be provided, and also correspondingly a plurality of further bonding connections 24. That is the case particularly if more complex circuits are provided for the sensor 16.

Via the bonding connections 24, it is possible to supply the sensor chip 10 with electrical energy and/or to transfer signals.

Figure 3:
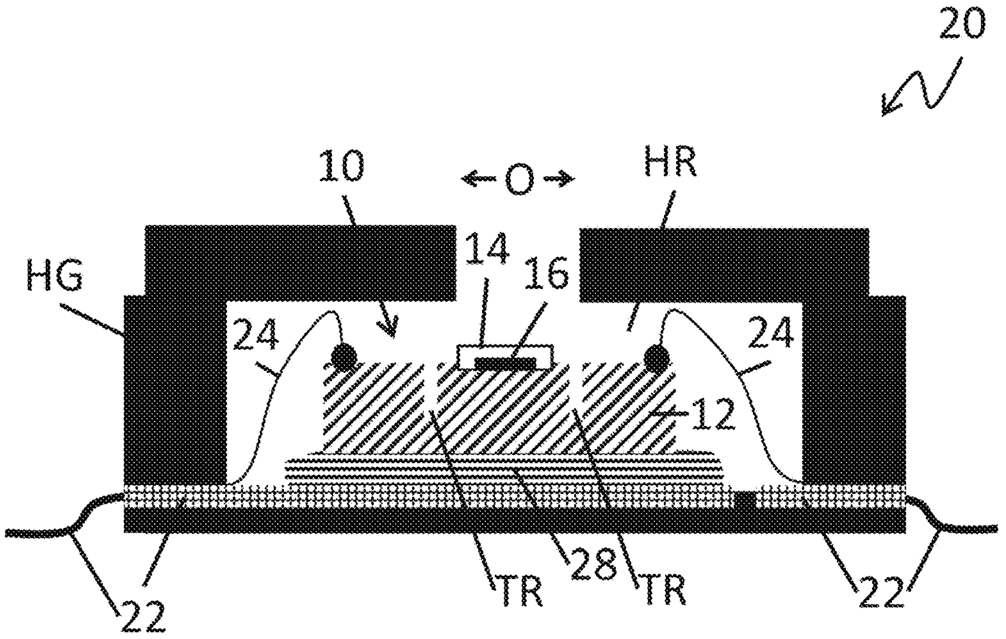
FIG. 3 shows a further illustration of the semiconductor device with a cavity.

FIG. 3 shows an alternative implementation to FIG. 2. The semiconductor device is once again designated by 20, and there is likewise the cavity housing HG and the cavity HR and also the opening O. The substrate 12 having the trench TR and also the sensor chip 10 comprising the sensor 16 and the sensor layer 14 are likewise illustrated. Via the bonding connections 24, an electrical connection to the outside world is again established via the contact 22. Furthermore, an adhesive layer 28 is provided, onto which the sensor chip 10 is adhesively bonded in order to be connected to the housing HG. The adhesive layer 28 is preferably configured as soft, so that it can afford the sensor chip 10 protection against further mechanical stresses.

The hydrogen can once again penetrate into the cavity HR through the opening O, and the sensor 16 comprising the sensor layer 14 can then detect the hydrogen concentration in accordance with its effect. As in other implementations, a calibration is advantageous in this case.

The substrate 12 once again has the trenches TR or the trench TR, a respective bonding connection 24 being led to a respective contact 22 via the contact pads 26. Optionally, the implementation illustrated in FIG. 3 can also be implemented without a trench TR.

Figure 4:
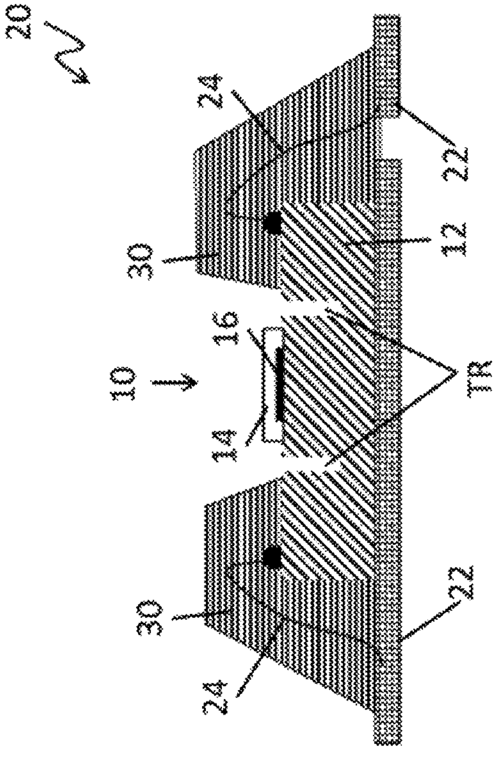
FIG. 4 shows a schematic illustration of the semiconductor device with mold compound.

FIG. 4 shows a further illustration of the semiconductor device 20 comprising the sensor chip 10 applied to the substrate 12, which once again has the trench TR, and also the contact pads 26 with the bonding connections 24 and the contact 22.

In FIG. 4, instead of a cavity housing HG, provision is now made of a mold compound 30, which covers the substrate 12 with the bonding connections 24 and the contacts 26, while the trenches TR or the trench TR and the sensor layer 14 are open in order to be ready for the measurement. In this implementation, the trench TR is optional, but particularly advantageous in order to afford additional protection against further mechanical stresses.

Figure 5:
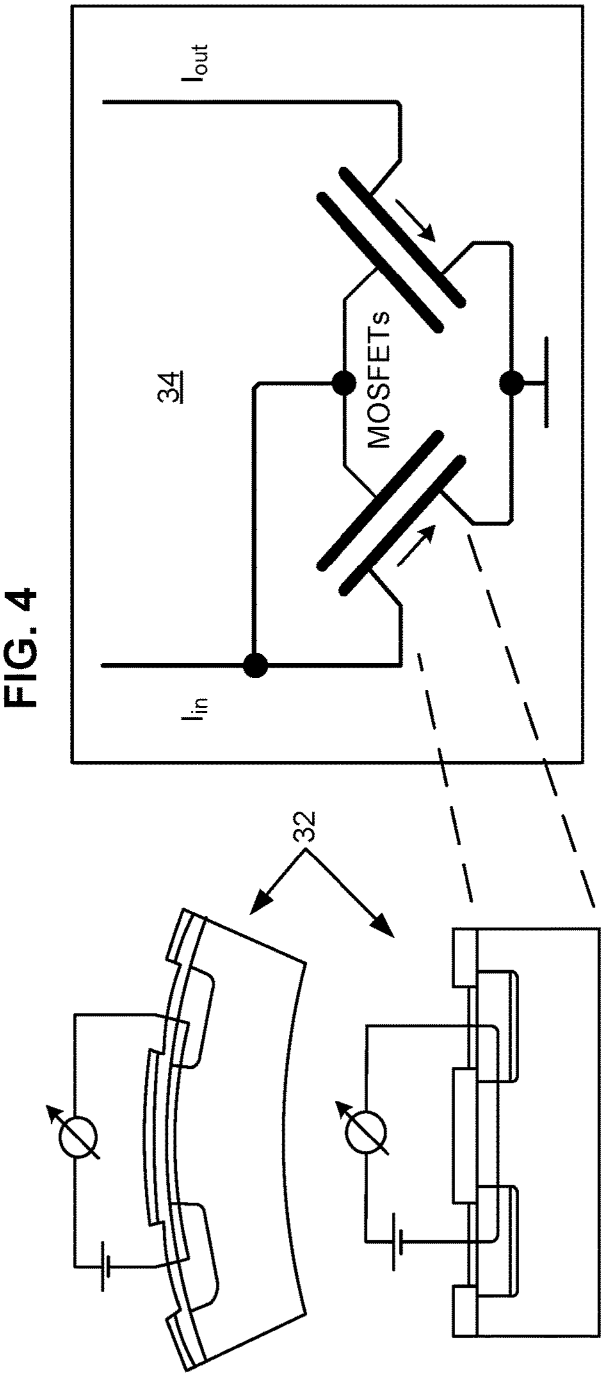
FIG. 5 shows an illustration of the semiconductor device with a current minor circuit.

FIG. 5 shows, on the left-hand side, transistors 32 as sensor 16 in a state relieved of mechanical stress at the bottom and in a state under mechanical stress at the top. A transistor 32 comprising a source, a drain and a gate is shown. This is therefore a field effect transistor, preferably produced using CMOS technology. This transistor 32 is arranged in a current minor circuit 34 with input current $I_{in}$ and output current $I_{out}$. The transistor 32 is arranged within the sensor 16 in such a way that it can take up a mechanical stress of the sensor layer 14. The right-hand transistor of the current mirror circuit 34 is arranged in such a way that it is independent of a mechanical stress of the sensor layer 14.

If the transistor 32 is then put under mechanical stress by the sensor layer 14, but the right-hand transistor of the current minor 34 is not, this changes the output current $I_{out}$ of the current mirror 34. A precise representation of the measured hydrogen concentration is thus possible by way of this circuit. This is because the hydrogen results in a mechanical stress in the case of a transistor 32 comprising piezoresistive channels, for example. This changes the electrical properties of the transistor 32, which, in respect of its arrangement in the current mirror 34, results in a changed output current $I_{out}$ of the current mirror 34. In this example, the sensor 16 has the transistor 32 comprising its piezoresistive channels and the current minor circuit 34. The piezoresistive channels are connected to the sensor layer 14 and take up the mechanical stresses thereof.

In one implementation, the current minor circuit 34 can be constructed symmetrically, that is to say that its left-hand transistor 32 and its right-hand transistor are configured identically. If the transistor 32 is not under mechanical stress, as illustrated at the bottom of the left-hand half of FIG. 5, then the symmetrical construction of the current mirror 34 means that no current flows through the current mirror 34. If there is a change in the mechanical stress at the left-hand transistor 32, then the output current $I_{out}$ is no longer zero and this enables the measurement of the hydrogen concentration.

The invention claimed is:

1. A semiconductor device for measuring a hydrogen comprising:

a sensor chip comprising:

a sensor layer, wherein a mechanical stress of the sensor layer changes upon contact with the hydrogen; and a sensor configured to detect a change in the mechanical stress of the sensor layer for measuring the hydrogen, wherein a structural arrangement of the semiconductor device provides at least one of the sensor layer or the sensor protection against further mechanical stresses.

2. The semiconductor device as claimed in claim 1, wherein the semiconductor device comprises one or more deformable components which are configured to protect the at least one of the sensor layer or the sensor against the further mechanical stresses.

3. The semiconductor device as claimed in claim 2, wherein the sensor chip further comprises:

a substrate, on which the sensor layer and the sensor are arranged, wherein the one or more deformable components comprise a trench in the substrate, the trench at least partly surrounding the sensor layer and the sensor.

4. The semiconductor device as claimed in claim 2, further comprising:

a cavity housing having an opening, via which a cavity formed by the cavity housing is connected to a surroundings of the semiconductor device, wherein the sensor chip is arranged within the cavity, and wherein the one or more deformable components comprise wire bonding connections of the sensor chip.

5. The semiconductor device as claimed in claim 2, further comprising:

a cavity housing having an opening, via which a cavity formed by the cavity housing is connected to a surroundings of the semiconductor device, wherein the sensor chip is arranged on the cavity housing within the cavity, wherein the one or more deformable components comprise an adhesive layer that bonds the sensor chip to a wall of the cavity housing.

6. The semiconductor device as claimed in claim 1, wherein the sensor is coupled to the sensor layer and is configured to detect the change in the mechanical stress of the sensor layer by translating the change in the mechanical stress into a change in at least one electrical parameter based on one or more of a piezoresistive effect or a piezomagnetic effect.

7. The semiconductor device as claimed in claim 1, wherein the sensor comprises a bridge circuit configured to generate a difference measurement based on the change in the mechanical stress of the sensor layer.

8. The semiconductor device as claimed in claim 6, wherein the sensor comprises a transistor comprising piezoresistive channels that are sensitive to changes in the mechanical stress of the sensor layer such that the piezoresistive channels are configured to generate a changed output based on the change in the mechanical stress of the sensor layer.

9. The semiconductor device as claimed in claim 3, further comprising:

a mold compound that covers outer regions of the substrate, wherein the mold compound has a coefficient of thermal expansion such that the mold compound is configured to protect at least one of the sensor layer or the sensor against thermally induced further mechanical stresses.

10. A method for measuring a hydrogen concentration in a medium using a semiconductor device comprising a sensor chip comprising a sensor layer and a sensor, a mechanical stress of the sensor layer changing upon contact with hydrogen present in the medium, and the sensor configured to detect a change in the mechanical stress of the sensor layer resultant from the contact with the hydrogen, the method comprising:

contacting the sensor layer with the medium; and detecting the change in the mechanical stress of the sensor layer using the sensor.

11. The semiconductor device as claimed in claim 3, wherein the trench defines a springlike structure within the substrate that surrounds the sensor layer and the sensor, and wherein the springlike structure is configured to protect the sensor layer and the sensor against the further mechanical stresses.

12. The semiconductor device as claimed in claim 11, wherein the trench delineates an inner region of the substrate, on which the sensor layer and the sensor are arranged, and outer regions of the substrate, on which contact pads of the sensor chip are arranged, and wherein the outer regions of the substrate are configured to bend relative to the inner region in response to the further mechanical stresses being applied to the sensor chip to protect the sensor layer and the sensor against the further mechanical stresses.

13. The semiconductor device as claimed in claim 12, further comprising:

a cavity housing having an opening, via which a cavity formed by the cavity housing is connected to a surroundings of the semiconductor device, wherein the sensor chip is arranged within the cavity, and wherein the one or more deformable components comprise wire bonding connections of the sensor chip.

14. The semiconductor device as claimed in claim 13, wherein the sensor chip is suspended within the cavity by the wire bonding connections.

15. The semiconductor device as claimed in claim 4, wherein the sensor chip is suspended within the cavity by the wire bonding connections.

16. The semiconductor device as claimed in claim 9, wherein the trench delineates an inner region of the substrate, on which the sensor layer and the sensor are arranged, and the outer regions of the substrate, on which contact pads of the sensor chip are arranged, and wherein the outer regions of the substrate are configured to bend relative to the inner region in response to the further mechanical stresses being applied to the sensor chip to protect the sensor layer and the sensor against the further mechanical stresses.

* * * * *